United States Patent [19]
Zanzig et al.

[11] Patent Number: 5,817,719
[45] Date of Patent: Oct. 6, 1998

[54] TIRE TREAD WITH QUANTITATIVE SILICA REINFORCEMENT

[75] Inventors: David John Zanzig, Uniontown; Paul Harry Sandstrom, Tallmadge; John Joseph Andre Verthe, Kent; Michael Julian Crawford, Akron, all of Ohio

[73] Assignee: The Goodyear Tire & Rubber Company, Akron, Ohio

[21] Appl. No.: 725,363

[22] Filed: Oct. 3, 1996

Related U.S. Application Data

[63] Continuation of Ser. No. 447,159, May 19, 1995, abandoned.

[51] Int. Cl.⁶ ..................................................... C08L 33/14
[52] U.S. Cl. .......................... 125/212; 525/191; 525/192; 525/197; 525/331.8; 525/333.1; 525/333.3; 525/333.5; 152/450; 152/525
[58] Field of Search ..................................... 525/191, 192, 525/197, 212, 331.8, 333.1, 333.3, 333.5; 152/525, 450

[56] References Cited

U.S. PATENT DOCUMENTS

| | | | |
|---|---|---|---|
| 3,938,574 | 2/1976 | Burmester et al. | 152/330 R |
| 5,063,268 | 11/1991 | Young | 524/286 |
| 5,405,927 | 4/1995 | Hsu et al. | 526/337 |

*Primary Examiner*—Duc Truong
*Attorney, Agent, or Firm*—Henry C. Young, Jr.

[57] ABSTRACT

The invention relates to a tire with a tread which is quantitatively reinforced with silica where the tread rubber is composed of a backbone of a combination of isoprene/butadiene copolymer rubber, cis 1,4-polyisoprene natural rubber and halogenated copolymer of isobutylene and p-methylstyrene. Such tread rubber may optionally also contain other elastomers such as, for example, cis 1,4-polybutadiene rubber and styrene/butadiene copolymer rubber.

19 Claims, No Drawings

TIRE TREAD WITH QUANTITATIVE SILICA REINFORCEMENT

This is a Continuation of application Ser. No. 08/447,159, filed on May 19, 1995, now abandoned.

FIELD

This invention relates to a tire having a rubber tread which is quantitatively reinforced with silica. In one aspect, the tread is comprised of a specified multiplicity of rubbers, namely a backbone of isoprene/butadiene rubber, natural rubber and halogenated isobutylene/p-methylstyrene copolymer, which is reinforced with a quantitative amount of silica and particularly a combination of a quantitative amount of silica together with a minor amount of carbon black.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, rolling resistance, traction and wear.

For various applications utilizing rubber including applications such as tires and particularly tire treads, sulfur cured rubber is utilized which contains substantial amounts of reinforcing filler(s). Carbon black is commonly used for such purpose and normally provides or enhances good physical properties for the sulfur cured rubber. Particulate silica, particularly precipitated silica, is also sometimes used for such purpose, particularly when the silica is used in conjunction with a coupling agent. In some cases, a combination of silica and carbon black is utilized for reinforcing fillers for various rubber products, including treads for tires.

It is important to appreciate that conventionally carbon black is considered to be a more effective reinforcing filler for rubber tire treads than silica if the silica is used without a coupling agent.

Indeed, at least as compared to carbon black, there tends to be a lack of, or at least an insufficient degree of, physical and/or chemical bonding between the silica particles and the rubber elastomers to enable the silica to become a reinforcing filler for the rubber for most purposes, including tire treads, if the silica is used without a coupler. While various treatments and procedures have been devised to overcome such deficiencies, compounds capable of reacting with both the silica surface and the rubber elastomer molecule, generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may be composed of a constituent component, or moiety, (such as, for example, an organo-silane) capable of reacting or otherwise combining with the silica surface and, also a constituent component, or moiety, (such as, for example, sulfur) capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, a silane of a coupling agent can apparently form a bond to the silica surface, possibly through hydrolysis, and the rubber reactive component of the coupling agent, such as sulfur, can combine with the rubber itself. The rubber reactive component of the coupler can be somewhat temperature sensitive at higher temperatures than a silane component and tend to combine with the rubber during the final and higher temperature sulfur vulcanization stage and, thus, subsequent to the rubber/silica/coupler mixing stage and, therefore, after a silane group of the coupler has combined with the silica. However, some degree of combination, or bonding, may perhaps occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, and is usually preferably a sulfur moiety.

Numerous coupling agents are taught for use in combining silica and rubber, such as for example, silane coupling agents containing a polysulfide component, or structure, such as bis-(3-triethoxysilylpropyl) tetrasulfide.

For silica reinforced tire treads, U.S. Pat. No. 5,066,721, in its Comparative Test Example 1 in Table 3 (column 15), discloses the use of solution polymerization prepared SBR containing 50 parts silica for a tire tread. Table 4 (column 17) illustrates the tire preparation. EPO application No. 501227-A also discloses the use of a solution polymerization prepared SBR which is silica reinforced and in which is preferenced over an emulsion polymerization prepared SBR. U.S. Pat. No. 4,519,430 discloses a silica rich tire tread which contains solution or emulsion SBR, optionally with polybutadiene rubber and/or polyisoprene rubber together with a mixture of silica and carbon black, with silica being required to be a major component of the silica/carbon black reinforcing filler.

Other U.S. patents relating to silicas and silica reinforced tire treads include U.S. Pat. Nos. 3,451,458; 3,664,403; 3,768,537; 3,884,285; 3,938,574; 4,482,663; 4,590,052, 5,089,554 and British 1,424,503.

In another aspect, tire treads have been disclosed which contain a halogenated copolymer of isobutylene and methyl styrene and a relatively minor amount of silica (eg. up to about 30 parts by weight silica per 100 parts by weight rubber) together with a silica coupler. For example, see U.S. Pat. Nos. 5,063,268 and 5,162,409.

SUMMARY AND PRACTICE OF THE INVENTION

In accordance with this invention, a pneumatic tire is provided having a tread rubber composition comprised of, (A) a combination of three elastomers comprised of (i) about 10 to about 80, preferably about 35 to about 70, weight percent of an isoprene/butadiene copolymer rubber containing about 5 to about 95, preferably about 30 to about 70, weight percent isoprene and having a Tg in a range of about −5° to about −95°, preferably about −35° to about −50° or about −70° to about −90° C., (ii) about 5 to about 40, preferably about 10 to about 25, weight percent of cis 1,4-polyisoprene natural rubber, and (iii) about 5 to about 40, preferably about 5 to about 25, percent of at least one halogenated copolymer of isobutylene and p-methyl styrene, wherein the ratio of isobutylene to p-methyl styrene is in a range of about 50/1 to about 7/1, preferably about 20/1 to about 9/1, (B) about 50 to about 110, preferably about 60 to about 85, phr particulate precipitated silica, (C) at least one silica coupler having a moiety reactive with the silica and another moiety reactive with at least one of said elastomers, and (D) zero to about 50 phr carbon black, wherein the weight ratio of silica to carbon black, if carbon black is used, is at least 1/1 and preferably at least 4/1 and where the total of silica and carbon black, if used, is about 60 to about 120, preferably about 70 to about 90 phr.

In further accordance with this invention, the rubber of said tread rubber composition is comprised of (A) about 20 to about 80 weight percent of said combination of isoprene/butadiene copolymer, natural rubber and halogenated copolymer of isobutylene and p-methyl styrene, and correspondingly (B) about 80 to about 20 weight percent of at least one other additional elastomer selected from homopolymers of conjugated dienes, such as, for example, isoprene and 1,3-butadiene, copolymers of conjugated dienes such as isoprene and 1,3-butadiene with monomers such as styrene and/or acrylonitrile and terpolymers of styrene/isoprene/butadiene and of styrene/butadiene/acrylonitrile.

Representative examples of such additional elastomers are cis 1,4-polybutadiene rubber, medium vinyl (30–60 percent vinyl content) polybutadiene, styrene/butadiene copolymer rubber (S-SBR and/or E-SBR), 3,4-polyisoprene rubber, butadiene/acrylonitrile copolymer rubber, styrene/isoprene/butadiene terpolymer rubber and styrene/butadiene/acrylonitrile terpolymer rubber.

In one aspect of the invention, a pneumatic tire is provided having a sulfur vulcanized tread comprised of said rubber composition.

The term "phr" as used herein, and according to conventional practice, refers to "parts of a respective material per 100 parts by weight of rubber".

The basic, or backbone, tri-elastomer blend of isoprene/butadiene copolymer rubber, cis 1,4-polyisoprene natural rubber and said halogenated copolymer is an important rubber blend of the invention designed to enhance properties of a tire tread containing a very substantial amount of silica reinforcement.

In the practice of this invention, organic solvent solution (S-SBR) or emulsion (E-SBR) polymerization prepared styrene/butadiene copolymer elastomers can be used.

While the optional emulsion polymerization styrene/butadiene (E-SBR) may have a styrene content in a range of about 20 to about 55 percent, in one aspect, it is preferred that it has a medium to relatively high styrene content, namely a styrene content in a range of about 30 to about 55 percent, such SBR is referred to herein as an E-SBR. The relatively high styrene content for the E-SBR is considered beneficial to enhance traction, or skid resistance, for the tire tread. The presence of the emulsion polymerization prepared SBR itself is considered beneficial to enhance processability of the uncured elastomer composition mixture, especially in comparison to a utilization of a solution polymerization prepared SBR.

By emulsion polymerization prepared E-SBR, it is meant that styrene and 1,3-butadiene are copolymerized as an aqueous emulsion. Such polymerization method is well known to those skilled in such art.

Natural rubber is beneficial for processing and compound tear strength.

The isoprene/butadiene copolymer rubber (IBR) is considered beneficial to reduce the tire's rolling resistance as also evidenced, on a predictability basis by a cured samples thereof exhibiting a suitable lower hysteresis as evidenced by Rebound values. In one aspect, it is considered that the IBR, having a Tg in a range of about −70° to about −80° C., can contribute predominantly to tire treadwear whereas an IBR with a Tg in a range of about −35° to about −50° C. can contribute predominantly to traction.

The IBR may be conveniently prepared, for example, by solution polymerization of isoprene and 1,3-butadiene under suitable polymerization conditions to achieve a desired Tg range, in its uncured state, of about −5° C. to about −95° C. and a ratio of isoprene to butadiene ratio in a range of about 95/5 to about 5/95. The Tg refers to the glass transition temperature which can conveniently be determined by a differential scanning calorimeter at a heating rate of 10° C. per minute.

The optional cis 1,4-polybutadiene rubber (BR) is considered to be beneficial to enhance the tire tread's wear, or treadwear.

Such BR can be prepared, for example, by organic solution polymerization of 1,3-butadiene.

The BR may be conventionally characterized, for example, by having at least a 90% cis 1,4-content.

The cis 1,4-polyisoprene natural rubber is well known to those having skill in the rubber art.

The halogenated copolymer of isobutylene and p-methyl styrene, as hereinbefore described desirably has a ratio of isobutylene to p-methyl styrene in a range of about 12/1 to about 8/1.

In practice, the halogenated copolymer may, for example, first be prepared by copolymerizing isobutylene and p-methylstyrene. Then the copolymer may be halogenated with a halogen, such as with bromine by bromination of the isobutylene/p-methylstyrene copolymer which occurs at the paramethyl position, yielding a benzyl bromide functionality. The degree of bromination can be typically varied from about 0.5 weight percent to about 2.5 weight percent bromine, based on the copolymer of isobutylene and p-methylstyrene. For tire tread applications, it is considered herein that about 1.5 weight percent to about 2.5 weight percent bromine is preferred.

The following reference provide additional information relating to the preparation of such halogenated copolymers: (i) "A New Isobutylene Copolymer: Non-tire Uses", D. Kruse and J. V. Fusco, *Rubber & Plastics News,* Feb. 1, 1993.

Such a halogenated copolymer may, for example, have the following physical characteristics: Mooney viscosity, ML(1+8) at 125° C. in a range of about 35° to about 60° and a Tg in a range of about −50° to about −60° C.

Typically, the halogen for such halogenation is bromine. Thus, typically the halogenated copolymer is a brominated copolymer of isobutylene and p-methylstyrene.

It is considered herein that the halogenated copolymer is beneficial, at least in part because of its fully saturated backbone and a relatively stable, pendant functionality which is achieved by the aforesaid bromination in the p-methyl position. It is considered herein that the halogenated copolymer is desirable in the tire tread rubber composition in order to improve, or enhance, its traction. It is also considered herein that it enhances tire handling.

Thus, in the practice of this invention, the aforesaid balanced tri-elastomer blend backbone, which can optionally contain additional elastomers, is provided which relies upon silica reinforcement which, in turn, relies on a silica coupler for the silica's reinforcing effect for the rubber blend.

In another aspect, for the purposes of this invention, such rubber tread also may contain carbon black where a weight ratio of silica to carbon black is at least about 1.5/1, preferably at least about 4/1 and for some applications at least 10/1.

The siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

The BET surface area of the pigment, as measured using nitrogen gas, is preferably in the range of about 100 to about 200, preferably about 120 to about 180, square meters per gram. The BET method of measuring surface area is described in the *Journal of the American Chemical Society*, Volume 60, page 304 (1930).

The silica also typically has a dibutylphthalate (DBP) absorption value in a range of about 200 to about 400, and usually about 250 to about 300 cubic centimeter per 100 grams.

Various commercially available silicas may be considered for use in this invention such as, for example only and without limitation, silicas commercially available from PPG Industries under the Hi-Sil trademark with designations 210, 243, etc; silicas available from Rhone-Poulenc, with designations of Z1165MP and Z165GR and silicas S available from Degussa AG with designations VN2 and VN3, etc.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. Retarders are also used to control the onset of vulcanization. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary or and a secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention which is more primarily directed to the utilization of specified blends of rubbers, particularly the aforesaid backbone of isoprene/butadiene copolymer rubber, natural rubber and halogenated copolymer, in tire treads, in combination with silica and silica coupler.

The tire can be built, shaped, molded and cured by various methods which will be readily apparent to those having skill in such art.

The invention may be better understood by reference to the following examples in which the parts and percentages are by weight unless otherwise indicated.

EXAMPLE I

A rubber composition composed of a blend of isoprene/butadiene copolymer rubber having a Tg of about −45°, (IBR), cis 1,4-polybutadiene rubber (BR) and cis 1,4-polyisoprene rubber (NR) were prepared and identified herein as Sample W.

A similar rubber composition was prepared which included a halogenated copolymer of isobutylene/p-methylstyrene and identified herein as Sample X.

A rubber composition (compounded rubber) was prepared of a blend of isoprene/butadiene copolymer rubber (IBR), cis 1,4-polybutadiene rubber (BR), cis 1,4-polyisoprene natural rubber (NR) and emulsion polymerization prepared styrene/butadiene copolymer rubber (E-SBR) and referred to herein as Sample Y.

A similar rubber composition was prepared which included a halogenated copolymer of isobutylene/p-methylstyrene and identified herein as Sample Z.

The rubber compositions were prepared by mixing the ingredients in several stages, namely, two non-productive stages (without the curatives) and a productive stage (for the curatives), then the resulting composition was cured under conditions of elevated temperature and pressure.

All of the ingredients for the two non-productive mix stages were mixed in the first non-productive stage except for zinc oxide and antidegradants and about 20 to about 50 percent of the reinforcing fillers, primarily silica, with proportional amounts of coupler and processing oil, which were added in the second non-productive mixing stage.

The ingredients were mixed in each non-productive mixing stage to a temperature of about 165° C. for about 5 minutes, all in a suitable rubber mixer. In the final, productive mix stage, the resulting rubber composition (mixture) was then mixed the curatives in a Banbury type mixer, namely, the accelerator(s) and sulfur to a temperature of about 120° C. for about 3 minutes. The rubber composition was then vulcanized at a temperature of about 150° C. for about 18 minutes.

The rubber compositions were comprised of the ingredients illustrated in Table 1. Table 2 illustrates properties of the cured rubber compositions.

TABLE 1

| Sample # | W | X | Y | Z |
| --- | --- | --- | --- | --- |
| Non-Productive Mix Stages | | | | |
| E-SBR[1] | 0 | 0 | 30 | 25 |
| IBR[2] | 50 | 40 | 30 | 25 |
| BR[3] | 25 | 25 | 20 | 20 |
| Natural Rubber[4] | 25 | 25 | 20 | 15 |
| Halogenated ISR[5] | 0 | 10 | 0 | 15 |
| Processing Oil[6] | 35 | 35 | 35 | 35 |
| Fatty Acid | 2 | 2 | 2 | 2 |
| Silica[7] | 80 | 80 | 80 | 80 |
| Coupling Agent[8] | 12 | 12 | 12 | 12 |
| Plasticizer, resin and wax(es) | 14 | 14 | 14 | 14 |
| Productive Mix Stage | | | | |
| Sulfur | 1 | 1 | 1 | 1. |
| Sulfenamide and Thiuram Type Accelerators | 4 | 4 | 4 | 4 |
| Zinc Oxide | 4 | 4 | 4 | 4 |
| Antidegradants[9] | 3 | 3 | 3 | 3 |

1) Emulsion polymerization prepared SBR having a styrene content of about 41 percent of the type obtainable as 1721 from the Huels AG company.
2) Isoprene/butadiene copolymer rubber having an isoprene content of about 50 percent obtained from The Goodyear Tire & Rubber Company, and a Tg of about −45° C.
3) Cis 1,4-polybutadiene rubber obtained as Budene® 1207 from The Goodyear Tire & Rubber Company.
4) Natural rubber (cis 1,4-polyisoprene);
5) Brominated copolymer of isobutylene and p-methylstyrene with isobutylene/p-methylstyrene ratio of about 12/1 and reportedly having the properties of a Mooney ML(1+8) value, at 125° C. of about 45, a Tg of about −60° C., and about 2 weight percent bromine, obtained as Bromo EMDX 90-10 from the Exxon Chemical Company;
6) High aromatic oil.
7) A silica obtained as Hi-Sil 210 from PPG Industries;
8) obtained as bis-3-triethoxysilylpropyl)tetrasulfide (50% active) commercially available as X50S from Degussa as a 50/50 blend of the tetrasulfide with N330 carbon black (thus, considered 50% active).
9) Of the alkylaryl paraphenylene diamine and polymerized dihydro trimethylquinoline type;

TABLE 2

| Sample # | W | X | Y | Z |
| --- | --- | --- | --- | --- |
| Rheometer (150° C.) | | | | |
| Max. Torque (dNm) | 21.4 | 20.3 | 20.5 | 21.0 |
| Min. Torque (dNm) | 4.2 | 4.1 | 4.5 | 4.5 |
| $T_{90}$, minutes | 14.0 | 14.8 | 15.3 | 17.4 |
| $T_{25}$, minutes | 8.6 | 8.9 | 4.2 | 4.1 |
| Stress-Strain | | | | |
| Tensile Strength, MPa | 14.6 | 13.1 | 14.5 | 12.9 |
| Elongation at Break, % | 528 | 478 | 537 | 460 |
| 100% Modulus, MPa | 2.3 | 2.5 | 2.3 | 2.7 |
| 300% Modulus, MPa | 8.2 | 8.5 | 8.3 | 8.8 |
| Rebound | | | | |
| 100° C., (%) | 61 | 63 | 60 | 61 |
| 23° C. (%) | 39 | 36 | 35 | 31 |
| Hardness (Shore A) | | | | |
| 23° C. | 66 | 66 | 66 | 65 |
| Dynamic Mechanical Properties | | | | |
| Tan Delta at 60° C. | 0.092 | 0.093 | 0.093 | 0.096 |
| Tan Delta at 0° C. | 0.203 | 0.246 | 0.219 | 0.282 |
| E* at 0°, MPa | 23.3 | 19.8 | 36.8 | 32.2 |
| DIN Abrasion Resistance (Relative Volume Loss, cc) | 85 | 65 | 122 | 141 |

These properties of the rubber compositions demonstrate that anticipated properties for a tire tread would be improved traction while maintaining rolling resistance and abrasion resistance when using halogenated ISR because tan delta at 0° C. is increased and room temperature rebound is decreased and tan delta at 60° C., hot rebound and abrasion resistance is similar.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread rubber composition comprised of (A) a combination of at least three elastomers comprised of (i) about 10 to about 80 weight percent of either (a) an isoprene/butadiene copolymer rubber consisting essentially of isoprene and butadiene units and containing about 30 to about 70 weight percent isoprene and having a Tg in a range of about −35° C. to about −50° C. or (b) an isoprene/butadiene copolymer rubber containing about 30 to about 70 weight percent isoprene and having a Tg in a range of about −70° C. to about −80° C., (ii) about 5 to about 40 weight percent of cis 1,4-polyisoprene natural rubber, and (iii) about 5 to about 40 weight percent of a brominated copolymer of isobutylene and p-methyl styrene containing about 0.5 to about 2.5 weight percent bromine and where its isobutylene/p-methyl styrene ratio is in a range of about 50/1 to about 7/1, (B) about 50 to about 100 phr particulate precipitated silica, (C) at least one silica coupler having a moiety reactive with said silica and another, sulfur, moiety reactive with at least one of said elastomers, and (D) up to about 50 phr carbon black, wherein the weight ratio of silica to carbon black is at least 1/1 where the total of silica and carbon black is about 60 to about 120 pr.

2. The pneumatic tire of claim 1 wherein said halogenated copolymer is a brominated copolymer of isobutylene and p-methylstyrene containing about 1.5 to about 2.5 weight bromine and has a Mooney viscosity value, ML(1+8) at 125° C. in a range of about 35° to about 60° and a Tg in a range of about −50° to about −60° C.

3. The pneumatic tire of claim 2 where said tread composition contains both silica and carbon black and the weight ratio of silica to carbon black is at least 4/1.

4. The pneumatic tire of claim 3 where said tread rubber is comprised of (A) about 20 to about 80 weight percent of said combination of isoprene/butadiene copolymer, natural rubber and brominated copolymer of isobutylene and p-methylstyrene, and correspondingly (B) about 80 to about 20 weight percent of one additional elastomer selected from homopolymers of isoprene and 1,3-butadiene, copolymers of isoprene or butadiene with styrene or acrylonitrile and terpolymers of styrene/isoprene/butadiene and styrene/butadiene/acrylonitrile.

5. The pneumatic tire of claim 4 where the other elastomer (ii) for said tread rubber is selected from at least one of homopolymer of 1,3-butadiene as cis 1,4-polybutadiene, medium vinyl (30–60 percent vinyl) polybutadiene, 3,4-polyisoprene, styrene/butadiene copolymer, styrene/isoprene/butadiene terpolymer and styrene/butadiene/acrylonitrile terpolymer.

6. The pneumatic tire of claim 5 where the styrene/butadiene copolymer elastomer is an organic solvent solution polymerization prepared copolymer.

7. The pneumatic tire of claim 5 where the styrene/butadiene copolymer elastomer is an emulsion polymerization prepared copolymer.

8. The tire of claim 4 where said silica is characterized by having a DBP absorption value in a range of about 200 to about 400 cubic centimeters per 100 grams. and a BET surface area in a range of about 100 to about 250 square meters per gram.

9. The tire of claim 4 where the weight ratio of silica to carbon black is at least 10/1.

10. The tire of claim 4 where the said coupler is a bis-3-(triethoxysilylpropyl)tetrasulfide.

11. The pneumatic tire of claim 1 having a tread rubber composition comprised of (A) a combination of at least three elastomers comprised of (i) about 35 to about 70 weight percent of an isoprene/butadiene copolymer rubber containing about 30 to about 70 weight percent isoprene and having a Tg in a range of about −35° to about −50° C., or about −70° C. to about −80° C., (ii) about 10 to about 25 weight percent of cis 1,4-polyisoprene natural rubber, and (iii) about 5 to about 25 weight percent of a brominated copolymer of isobutylene and p-methyl styrene where its isobutylene/p-methyl styrene ratio is in a range of about 20/1 to about 9/1, () about 50 to about 85 phr particulate precipitated silica, (C) at least one silica coupler having a moiety reactive with said silica and another, sulfur, moiety reactive with at least one of said elastomers, and (D) up to about 50 phr carbon black, wherein the weight ratio of silica to carbon black is at least 1/1 where the total of silica and carbon black is about 70 to about 90 phr; wherein said brominated copolymer of isobutylene and p-methylstyrene contains about 1.5 to about 2.5 weight bromine and has a Tg in a range of about −50° C. to about −60° C.

12. The pneumatic tire of claim 11 where said tread composition contains both silica and carbon black and the weight ratio of silica to carbon black is at least 4/1.

13. The pneumatic tire of claim 12 where said tread rubber is comprised of (i) about 20 to about 80 weight percent of said combination of isoprene/butadiene copolymer, natural rubber and brominated copolymer of isobutylene and p-methylstyrene, and correspondingly (ii) about 80 to about 20 weight percent of one additional elastomer selected from homopolymers of isoprene and 1,3-butadiene, copolymers of isoprene or butadiene with styrene or acrylonitrile and terpolymers of styrene/isoprene/butadiene and styrene/butadiene/acrylonitrile.

14. The pneumatic tire of claim 13 where the other elastomer (ii) for said tread rubber is selected from at least one of homopolymer of 1,3-butadiene as cis 1,4-polybutadiene, medium vinyl (30–60 percent vinyl) polybutadiene, 3,4-polyisoprene, styrene/butadiene copolymer, styrene/isoprene/butadiene terpolymer and styrene/butadiene/acrylonitrile terpolymer.

15. The pneumatic tire of claim 14 where the styrene/butadiene copolymer elastomer is an organic solvent solution polymerization prepared copolymer.

16. The pneumatic tire of claim 15 where the styrene/butadiene copolymer elastomer is an emulsion polymerization prepared copolymer.

17. The tire of claim 16 where said silica is characterized by having a DBP absorption value in a range of about 200 to about 400 cubic centimeters per 100 grams and a BET surface area in a range of about 100 to about 250 square meters per gram.

18. The tire of claim 17 where the weight ratio of silica to carbon black is at least 10/1.

19. The tire of claim 12 where the said coupler is a bis-3-(triethoxysilylpropyl)tetrasulfide.

* * * * *